UNITED STATES PATENT OFFICE.

RUDOLPH SOMMERS, OF GLASTONBURY, CONNECTICUT.

IMPROVEMENT IN TOILET WASHING-POWDER.

Specification forming part of Letters Patent No. 188,549, dated March 20, 1877; application filed January 19, 1877.

*To all whom it may concern:*

Be it known that I, RUDOLPH SOMMERS, of Glastonbury, in the county of Hartford and State of Connecticut, have invented certain new and useful Improvements pertaining to Toilet Washing-Powder, of which the following is a specification:

This new composition of matter is a mixture for washing the hands and face.

The ingredients and proportions, substantially, are as follows: Pulverized white soap, two and one-half pounds; pulverized bitter almonds, two pounds; pulverized orris-root, six pounds; oil of bitter almonds or myrbane, one-half ounce; sweet almond-oil or olive-oil, eight or ten ounces; flour of some of the cereals, ten pounds. (I prefer under this head to use two pounds of rice flour and eight pounds of wheat flour.) To this may be added a flavoring-oil, as oil of geranium, about one-half ounce. These ingredients, finely powdered and intimately and thoroughly mixed together, form the composition.

It is not essential that these exact proportions be used, though they should be substantially as given.

The reduction of the whole to a fine powder makes it immediately and completely soluble in water, and allows me to use but a comparative trifle of soap, and thus avoid irritating the tenderest skin, and avoid, as well as heal, chapping of the hands.

Formula for the preparation of myrbane: Take purified benzoin, two pounds; monohydrated nitric acid, two pounds; sulphuric acid, one pound. Mix the nitric and sulphuric acids in a retort of six quarts capacity. Adapt to this retort a cork pierced with two holes. Through one of these two holes pass a tube at least one yard in length, for the disengagement of the gas, and through the other hole a tube terminated by a funnel. Pour the benzoin by degrees through the funnel, slightly shaking the balloon each time. The operation is perfected when the essence has a golden-yellow color at a temperature of 59°. It takes three or four hours. The longer it is the better the result. Decant the liquid, wash it several times with water, and filter.

I claim as my new composition of matter—

A toilet washing-powder composed of pulverized white soap, bitter almonds, orris-root, cereal flour, oil of bitter almonds and sweet almonds, in substantially the proportions specified.

RUDOLPH SOMMERS.

Witnesses:
WM. E. SIMONDS,
ROBT. F. GAYLORD.